United States Patent [19]
Rathbun

[11] 3,922,342
[45] Nov. 25, 1975

[54] POISON IVY AND POISON OAK TREATMENT UTILIZING HYDROPHILIC ANION EXCHANGE MATERIAL

[75] Inventor: William B. Rathbun, St. Paul, Minn.

[73] Assignee: The Regents of the University of Minnesota, Minneapolis, Minn.

[22] Filed: May 7, 1973

[21] Appl. No.: 358,100

[52] U.S. Cl. ................................. 424/79; 424/78
[51] Int. Cl.$^2$ ............... A61K 31/715; A61K 31/74
[58] Field of Search.................... 424/78, 79, 180

[56] References Cited
UNITED STATES PATENTS
2,951,012   8/1960   Gisvold................................ 424/79

OTHER PUBLICATIONS

Thurmon et al.–Chem. Abst. Vol. 53 (1959) page 3612e.
Miranda et al.–Chem. Abst. Vol. 57 (1962) page 8830a.
Spross et al.–Chem. Abst. Vol. 62 (1965) page 15996e.
Barlow et al.–Chem. Abst. Vol. 58 (1963) page 1710d.

*Primary Examiner*—Albert T. Meyers
*Assistant Examiner*—A. P. Fagelson

[57] ABSTRACT

A method for the removal from the skin of the active phenolic compounds which cause an allergic response in some individuals who have been exposed to oils of plants of the Anacardiacea family, of which poison ivy and poison oak are representative. The method utilizes hydrophilic anion exchange material applied topically to the affected skin area in a suitable carrier, such as in a buffered aqueous suspension. Following sufficient contact time (i.e. about 20 to 60 minutes) the anion exchange material is removed and discarded. The treated area is rinsed with water and dried. The method has been found to be effective in the rapid removal of the vesicant principles of poison ivy and poison oak. The materials are inexpensive and accepted as safe for topical use. They are stable and easily applied without medical assistance.

6 Claims, No Drawings

POISON IVY AND POISON OAK TREATMENT UTILIZING HYDROPHILIC ANION EXCHANGE MATERIAL

This invention is directed to the use of hydrophilic anion exchange materials in the treatment of allergic symptoms caused by plants of the plant family Anacardiacea, particularly represented in this country by poison ivy (Rhus toxicodendron radicans), eastern poison oak (Rhus toxicodendron quercifolium) and western poison oak (Rhus toxicodendron diversilobum), and other similar plants found throughout the world. The invention is directed to a method for the external treatment of the allergic dermatitis caused by contact with the oils of poison ivy and related plants of the family Anacardiacea by the removal of the active skin corrosive phenolic principles in those oils which cause an allergenic response in many, or perhaps most, individuals.

Common treatment of the vesicant action of the phenols contained within the plant family Anacardiacea has usually consisted of washing the affected skin area with soap and warm water, or rinsing the area with rubbing alcohol or covering with calamine lotion. It is common experience that these methods have not proved to be satisfactory in relieving the intense itching and blistering of the skin. Medical treatment of severe cases has utilized steroid injection. More recently intramuscular injections of hydrourushiol have shown promise of reducing individual sensitivity to the allergenic principles of these plants oils, but these injections apparently have to be repeated at intervals to maintain the refractory state.

The use of ion exchange materials in soaps, salves, lotions, creams, ointments, dusting powders, and the like for biocidal use, for treatment of diaper rash, as an aid to reepithelialization of cornea, to reduce skin bacteria population, for treatment of mycotic and bacterial infections, to control skin pH, and like uses. Thurmon U.S. Pat. Nos. 2,684,321 and No. 2,857,311 relate to the use of mixtures of several kinds or types of ion exchange materials in finely divided state for application to the skin for relief of a variety of chemical, botanical and biological irritants including poison ivy and poison oak. Mixtures of insoluble non-gel forming cation and anion exchange resins are applied as an ointment in a hydrophilic base such as glycerin or the like, or in a powder base, such as talc.

Gisvold U.S. Pat. No. 2,951,012 is directed to the treatment of contact dermatitis due to the allergens of poison ivy, poison oak and poison sumac based on the use of strong base anion exchange resins which are insoluble aromatic cross linked vinyl copolymers in which the anion exchange group is the hydroxyl ion. An essential component is an organic base such as an ethanol amine, ethylene diamine, piperazine or diethylaminoethanol. The material may be applied dry, as a powder, or suspended in a variety of solvent mixtures containing various glycols, alcohols and/or water, including benzyl alcohol which is sometimes used for its anesthetic action. The material is removed by sponging or gently rubbing the affected area on which, in some treatments, the exchanger presumably has dried onto the skin.

The toxic principles contained in the oils of the plant family Anacardiacea, where investigated, have been shown to be substituted phenols. In poison ivy, poison oak and the Japanese lac tree (Rhus vernicifulua), these compounds are catechols, containing a side chain in the three position of the phenolic ring. Following transfer of such materials to human skin, a vesicant or blistering action in allergic individuals may be noted at some time following exposure. The phenolic compounds apparently form an attachment of some nature with the skin and are not easily dislodged from this attachment.

The present invention is directed to the rapid removal of the allergenic principal by the application of a gel-like suspension of a hydrophilic water imbibing non-resinous anion exchange material directly to the skin for short periods of time. Depending upon the severity of the exposure, the exchange material is maintained in contact with the skin for from about 20 to 60 minutes and then removed. The treated area is flushed with water and dried. The itching sensation and all blisters are usually totally removed. A redness of the skin is generally all that remains and this usually soon disappears.

A preferred ion exchange material having the requisite properties in DEAE Sephadex, a diethylaminoethyl derivative of the well-known dextran gel known as "Sephadex" (as described in Flodin et al U.S. Pat. No. 3,002,823) and available from Pharmacia, Uppsala, Sweden, and its United States affiliate Pharmacia Fine Chemicals, Inc., Piscataway, N.J. Other commercially available alternative ion exchange materials include Bio-gel DM-2, a porous polyacrylamide gel having $-[CONH-CH_2-N+ N(C_2H_5)_2]_n$ X as the functional group, (Bio-Rad Laboratories, Richmond, Calif.) wherein X is Cl, or the anion of other acids, both strong and weak including but not limited to sulfuric, nitric, phosphoric, formic, acetic, and the like, and $n$ is 1 to 3; DEAE (diethylaminoethyl) cellulose, TEAE (triethylaminoethyl) cellulose, and the like.

The ion exchange material is admixed with an inert aqueous carrier to form a gel-like suspension. It may be applied easily in any shape required to cover the affected skin area. Generally the suspension is prepared in concentration of about 4 to 8 per cent (w/v) and preferably about 5 to 6 per cent in the case of DEAE Sephadex and about 35 to 55 per cent and preferably about 40 to 50 per cent in the case of Bio-gel and cellulosic exchangers. The wet cellulose ion exchangers, though not gels, due to their fibrous nature, form suspensions of gel consistency which may be applied as thick layers which will stick to the skin.

The gel or gel-like material may be prepared in advance of need and packaged in collapsible tubes, jars, plastic bags, or the like, from which they are readily dispensed upon realization of exposure to poison ivy or the like. Thus, campers, hunters, picnickers, and the like, may be forearmed by including a package of the suspended gel-like exchange material in their packs.

Although water alone may be used as the aqueous carrier, desirably it is buffered to a pH within the range from about 3 to 11 and preferably between about pH 6.5 to 9. A typical composition found to be extremely effective in the treatment of symptoms caused by poison ivy and pison oak is composed of about 5 to 6 parts by weight of DEAE Sephadex suspended in 100 parts of 0.01 to 0.1 M trishydroxymethylaminomethane and brought to pH 7.6 by addition of dilute sulfuric acid.

Typically the affected skin areas are maintained in contact with the wet suspension of ion exchange material for about 20 to 30 minutes although, in the case of severe exposure, the treatment may be extended for as long as about an hour. Rather than prolonging a single treatment, it is preferably to remove the ion exchange material and apply a fresh poultice. The material is applied as a relatively thick layer, desirably about 1/16 to 3/16 inch thick, applied gently with patting to distribute the exchange material substantially uniformly over the affected skin areas.

The invention is further illustrated by the following examples:

EXAMPLE 1

An 11 year old boy sensitive to ivy poisoning developed dermatitis within about 4 hours of accidental exposure to poison ivy on several different occasions. A single treatment with DEAE Sephadex in 0.02 M tris-hydroxymethylaminomethane at pH 7.6 prepared at about 4° C at times ranging from 4 to 24 hours following exposure for a period of 20 minutes was sufficient in each case to relieve immediate itching and blisters. A reddened skin area resulted after removal of the anion exchanger. This area soon reverted to its normal coloration.

EXAMPLE 2

A female, age 39, had poison ivy dermatitis on hands and arms due to picking of plant. A single 30 minute treatment with the exchanger as defined in Example 1 when applied 36 hours following exposure resulted in complete removal of the itching and dermatitis in all affected areas with the exception of a deep scratch sustained during the actual collection of the plant. Continued treatment allowed containment of the dermatitis to the depth of the scratch, preventing its spread to unaffected areas. It is probable that the exchanger did not physically penetrate the scratch.

EXAMPLE 3

A 39 year old male on several occasions was subjected to exposure to ivy poisoning affecting small areas on the hands. In each instance a single 30 minute treatment of the exchange material as in Example 1 completely relieved the symptoms as regards blisters and itching.

EXAMPLE 4

A 65 year old female who was extremely sensitive to poison ivy was subjected to exposure caused by contact with a family dog with a propensity for encounters with poison ivy growth. Extensive and severe dermatitis including weeping blisters on hands and arms results. Because of the nature of the contact, the exposure is recurring. Two weeks following the initial development of the dermatitis, the anion exchanger as in Example 1 was applied. Itching was immediately relieved and a cure of the dermatitis effected. Exchanger was used several times subsequently upon recurring exposure with similar success.

EXAMPLE 5

A 39 year old male was exposed to poison sumac from a swamp. The vesicant principle of poison sumac appears to act somewhat differently than that from poison ivy. Blisters can form on hands and may appear two weeks following exposure in a previously unaffected area. Blistering on the ring finger was so severe that the wedding ring was completely hidden. Treatment as in the case of ivy poisoning immediately relieved the itching sensation. However, repeated treatments were necessary because itching returned. The treatments of the dermatitis appeared relatively less effective than in the case of poison ivy. Similar results were observed in the case of a 9 year old body similarly exposed.

EXAMPLE 6

A 17 year old female contracted poision oak spread in patches generally all over her body including ankles, fronts and backs of legs, back, face, neck, hands and arms. She was treated without success with conventinal remedies over a period of 18 days. She slept poorly during this entire period due to intense ithcing. On the 18th day following exposure, a single application of the anion exchange material as in Example 1 was applied over the several affected areas for a period of 20 minutes each, followed by a shower. The itching sensation and all blisters were removed, leaving only reddened skin areas from which the redness soon disappeared.

EXAMPLE 7

Further tests were made in which dermatitis resulting from exposure to an extract of poison ivy was treated. Because of climatic conditions, leaves were not available. However, 65 grams of stems, buds and berries of poison ivy as it exists in central Minnesota in the middle of April was collected, cut into pieces and homogenized in a Waring Blendor with ethanol. The extract was filtered and the volume of the alcohol portion of the extract was reduced to about 75 ml and this material was applied to the skin.

a. During the preparation of the poison ivy extract, although the worker preparing the extract was aware of the effects of poison ivy and therefore was very careful, either fumes or vapors or slight spattering was picked up on his skin. In particular, one of the eye areas was affected. This required application of the ion exchange material in the immediate area of the eye. Both Sephadex at pH 7.6 and DM Bio-gel at 7.6 proved effective reducing the affected areas to slight redness which quickly disappeared and with no injury to the eye.

b. The extreme potency of the poison ivy extract was not appreciated. A 12 year old boy with known poison ivy sensitivity was used as a test subject. A single drop of the extract was placed on his wrist. This spread over an area of about 2 square inches. After 24 hours definite reaction had developed. The original area was discolored and the skin had risen about ⅛inch over the surrounding skin. Both the Sephadex and DM Bio-gel materials were applied for about 30 minutes and removed. The extreme potency of the applied extract was not recognized. Treatment was delayed until such time as a definite skin reaction had occurred. In the meantime the subject wore a long sleeved shirt which apparently carried the oil to other areas of the arm. This resulted in peripheral reactions over a total area of about 3 by 8 inches. These peripheral areas responded to treatments with Sephadex at pH 5.2, 6.4, 7.6 and 8.8; DM Bio-gel at pH 5.2 and 7.6 and DEAE cellulose at pH 7.6 and 8.8, although the treatment with DEAE cellulose was much less effective. Because of the severe reaction of the central area to which the poison ivy extract was directly applied, several treatments per day over a period of about 3 days was necessary to bring the dermatitis under control.

c. Very small amounts of the extract were applied to the skin of another subject, an adult male. The patches of dermatitis which developed were successfully treated with Sephadex at pH 5.2, 6.4, 7.6 and 8.8; with DM Bio-gel at pH 5.2, 7.2 and 7.6; and with DEAE cellulose at pH 7.6 and 8.8. The DEAE cellulose again proved much less effective than the other ion exchange material. Bio-gel causes a stinging sensation and has a somewhat disagreeable odor but otherwise is effective at the recited pH levels.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A method of treating allergic dermatitis caused by contact with plants of the Anacardiacea family, which method comprises:
  A. applying a composition consisting essentially of an aqueous suspension of a water-imbibing swellable non-resinous hydrophilic anion exchange material which is of gel consistency capable of adhering to the skin on the affected skin areas,
  B. maintaining said suspension in contact with the skin for at least about 10 minutes without substantial drying of the suspension,
  C. removing the anionic exchange material,
  D. rinsing the treated area with water, and
  E. drying the skin.

2. The method of claim 1 wherein said aqueous suspension is buffered to between about pH 6.5 and 9.

3. The method of claim 1 wherein said suspension is maintained in contact with the skin for about 20 to 60 minutes.

4. The method of claim 1 wherein said anion exchange material is a diethylaminoethyl derivative of dextran present in concentration between about 4 and 8 per cent.

5. The method of claim 1 wherein said anion exchange material is a diethylaminoethyl derivative of cellulose present in concentration between about 35 and 55 per cent.

6. The method of claim 1 wherein said exchange material is a triethylamino derivative of cellulose present in concentration between about 35 to 55 per cent.

* * * * *